April 27, 1965   J. V. MOLONEY   3,180,315
ADJUSTABLE DELIVERY AUTOMATIC STOCK FEEDER
Filed May 16, 1963   3 Sheets-Sheet 1
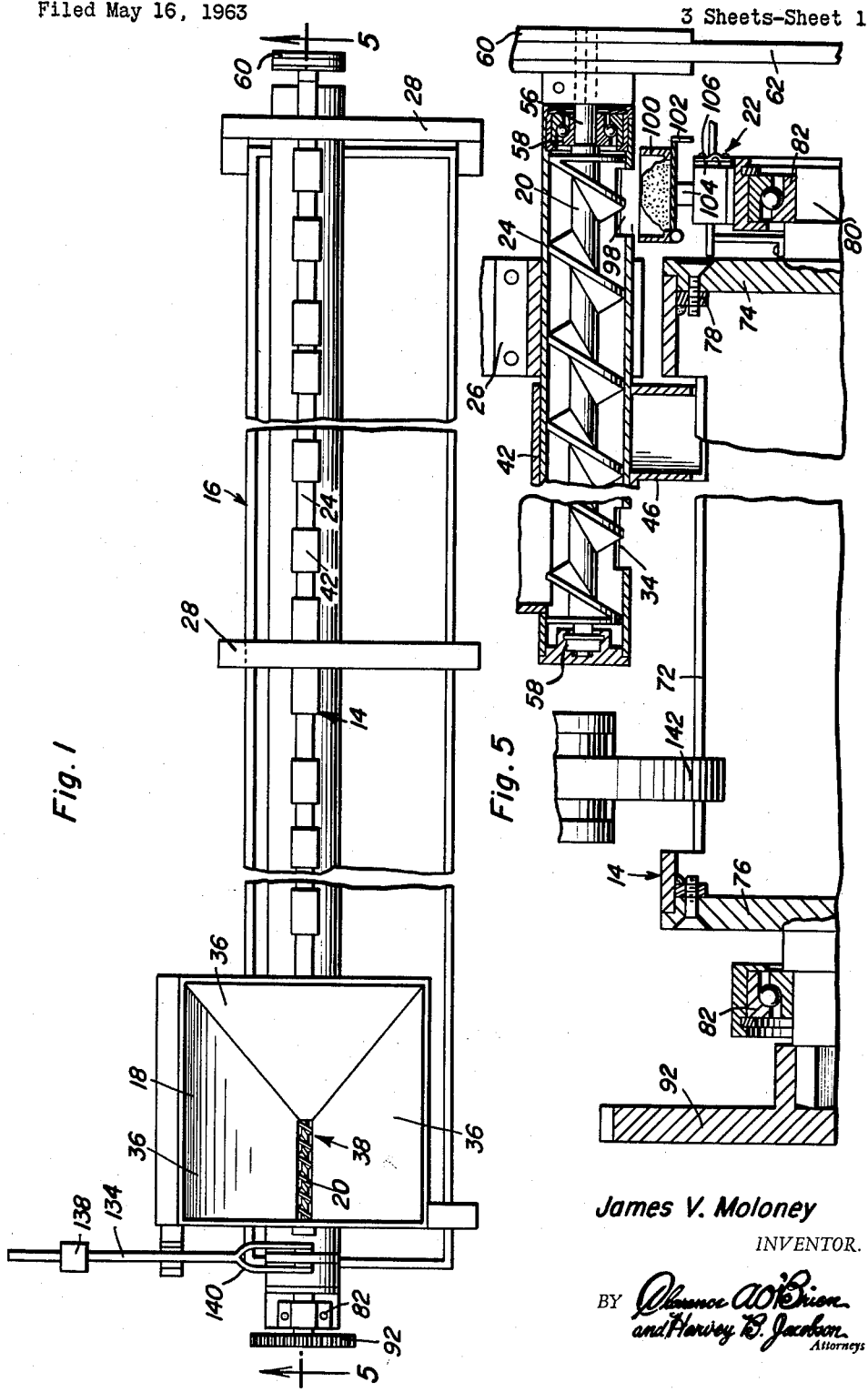
James V. Moloney
INVENTOR.

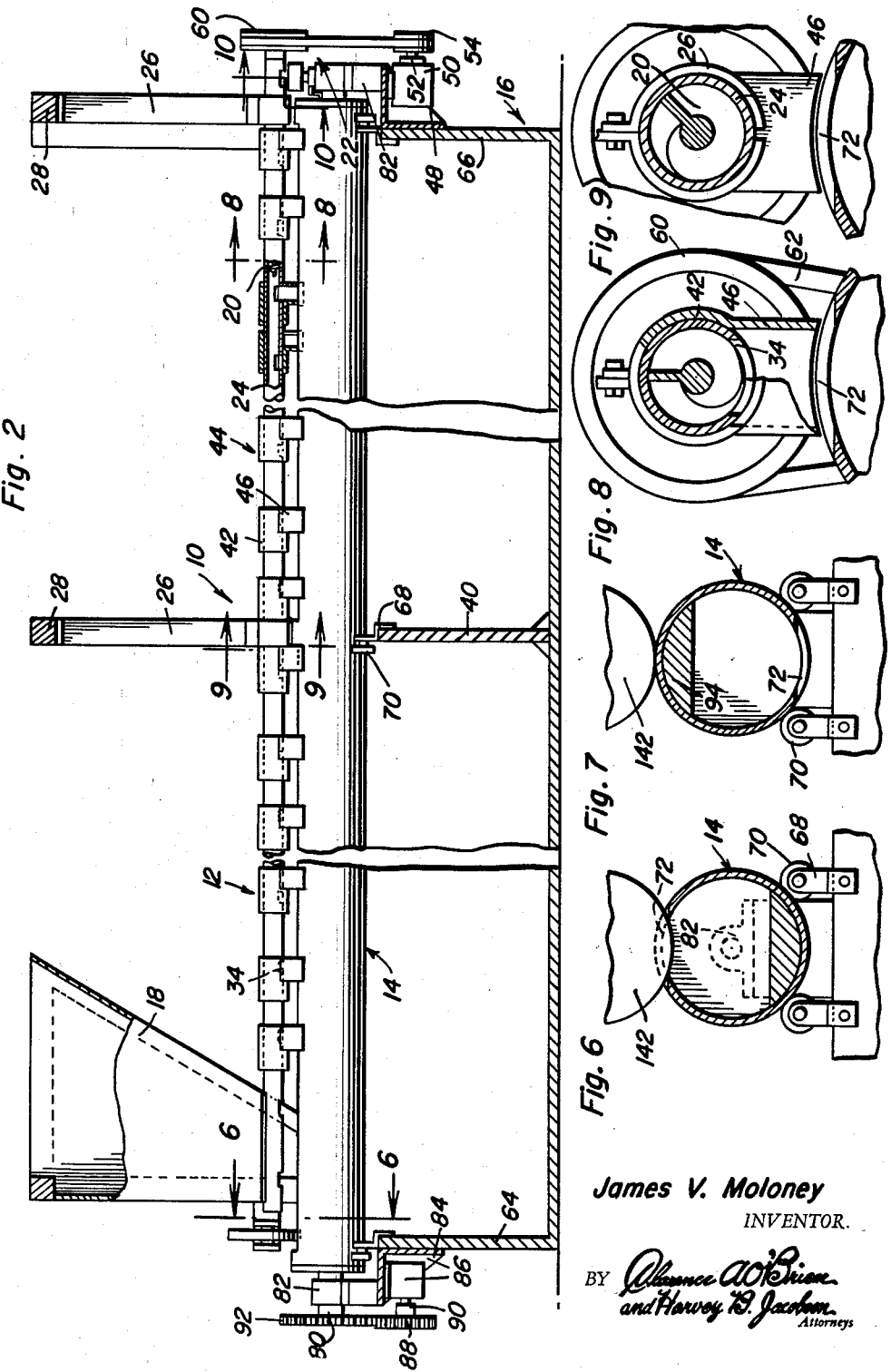

April 27, 1965  J. V. MOLONEY  3,180,315
ADJUSTABLE DELIVERY AUTOMATIC STOCK FEEDER
Filed May 16, 1963  3 Sheets-Sheet 3
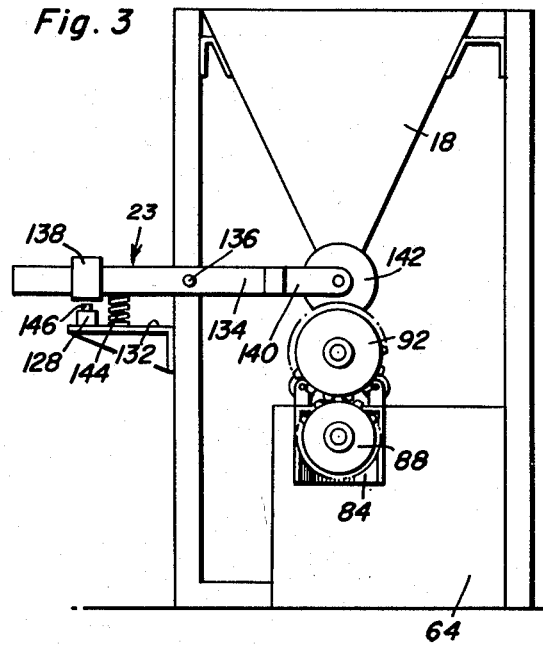
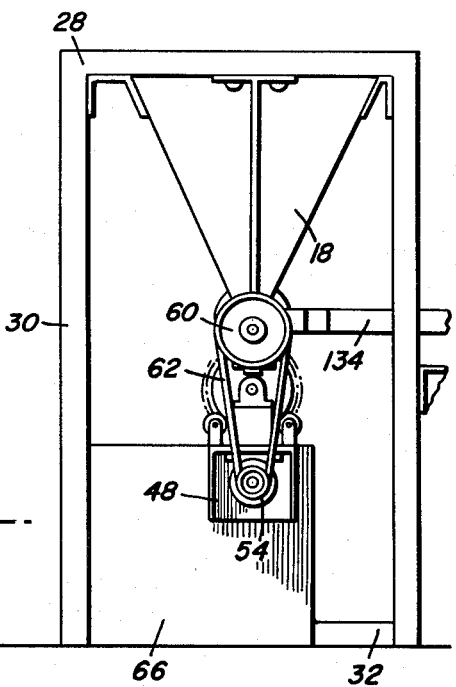
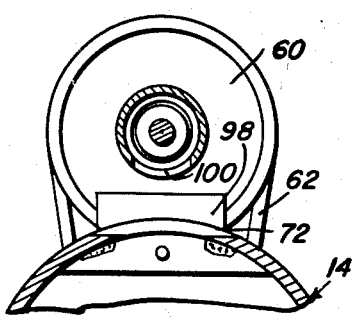
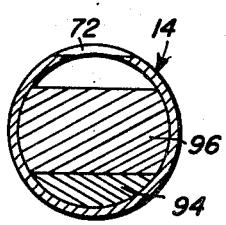
James V. Moloney
INVENTOR.

United States Patent Office 3,180,315
Patented Apr. 27, 1965

3,180,315
ADJUSTABLE DELIVERY AUTOMATIC
STOCK FEEDER
James V. Moloney, Rte. 1, Moxee City, Wash.
Filed May 16, 1963, Ser. No. 280,961
18 Claims. (Cl. 119—51.11)

This invention primarily relates to a stock feeder assembly specifically designed for controlling the amount of feed to be delivered to a stock pen.

It is one of the main objects of this invention to provide a stock feeder assembly wherein the amount of feed delivered to a plurality of stock pens may be varied without any regulation of the feed flow to the delivery means itself.

It is another object of this invention to provide apparatus for periodically and automatically filling a stock pen.

A still further object of this invention in accordance with the preceding objects resides in the provision of a conveyor means suspended above a feeder trough means for delivering feed to the trough. The trough may be operated independent of the feed delivery means whereby a quantity of feed may be stored therein and regardless of any later malfunction of the feed delivery means, the trough may be periodically rotated to dump the feed into the stock pens.

Yet another object of this invention resides in its simplicity of construction and economical and efficient operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view with parts broken away of the stock feeder assembly.

FIGURE 2 is a side view in elevation of the stock feeder assembly shown in FIGURE 1 with portions thereof shown in section to illustrate certain principles of operation embodied therein.

FIGURE 3 is a view in end elevation of the left hand side of the stock feeder assembly shown in FIGURE 2.

FIGURE 4 is a view in end elevation of the stock feeder assembly as seen from the right hand side of FIGURE 2.

FIGURE 5 is a fragmentary sectional view taken upon an enlarged scale substantially along the plane indicated by the line 5—5 of FIGURE 1.

FIGURE 6 is a fragmentary sectional view taken upon an enlarged scale substantially along the plane indicated by the line 6—6 of FIGURE 2.

FIGURE 7 is a view similar to FIGURE 6 but illustrating the metering trough in dumping position.

FIGURE 8 is a fragmentary sectional view taken upon an enlarged scale substantially along the plane indicated by the line 8—8 of FIGURE 2.

FIGURE 9 is a fragmentary sectional view taken upon an enlarged scale substantially along the plane indicated by the line 9—9 of FIGURE 2.

FIGURE 10 is a partial sectional view taken upon an enlarged scale substantially along the plane indicated by the line 10—10 of FIGURE 2.

FIGURE 11 is a cross-sectional view of the trough means illustrating a further modification which can be incorporated therein.

FIGURE 12 is a schematic wiring diagram illustrating the electrical controls of the apparatus.

*General organization*

Referring to the drawings in detail, the stock feeder assembly comprising the subject matter of the instant invention is generally designated by the numeral 10. The assembly includes a feed delivery means designated by the numeral 12 which is adapted to communicate with a metering trough such as 14 supported therebelow on a plurality of stock pens as indicated at 16. It will subsequently become apparent that feed is delivered from a hopper 18 to the feed delivery means 12 which includes a feed auger such as 20 comprising a portion of the stock feeder assembly 10. Means cooperate with the auger to vary the amount of feed conveyed by it to the metering tube or trough 14. After the trough 14 has been filled to capacity, control means such as generally indicated at 22, FIGURE 2, can be actuated to operatively condition the trough means for rotation about its longitudinal axis to dump the feed disposed therein into the pens 16. Due to a timing mechanism incorporated in the apparatus, this rotation of the trough means 14 can be made to occur at any predetermined time after the conditioning of the trough means for rotation. Because of this feature of the invention, it will be appreciated that if a subsequent malfunction of the feed delivery means occurs, it will have no effect on the independently operated trough means. A suitable starting mechanism such as generally shown at 23 is adapted to be periodically actuated to begin the feeding cycle to the trough. Upon the completion of the cycle, that is, the complete rotation of the dumping trough, the trough itself is adapted to automatically recondition the feeder assembly for another operating cycle. Therefore, it will be appreciated the apparatus comprising the subject matter of the instant invention is rendered automatic in operation at predetermined spaced time intervals.

*Feed delivery means*

As already mentioned, the feed delivery means 12 includes an auger conveyor 20, see FIGURE 5. The conveyor 20 is encased within a longitudinal tubular member 24 for its whole length. The auger and encompassing tube 24 are suspended, see also FIGURES 3 and 4, by means of vertical straps 26 from suitable overhead frame members 28 having depending leg portions such as 30 joined by a base such as 32 resting upon a supporting surface. The tube 24 includes at longitudinally spaced points, apertures such as 34 from which feed conveyed by the auger along the tube 24 may be dispensed. The hopper 18 comprises a plurality of downwardly convergent walls which slope as shown at 36. The bottom of the hopper is open to provide a discharge slot as shown at 38 and is adapted to communicate with the auger 20 through a corresponding cutout in the tube 24. As seen in FIGURES 3 and 4, the hopper 18 is also supported from suitable frame members. It should thus be understood that upon feed being disposed within the hopper 18 the feed will be caused to slide down the sloping side walls 36 and onto the auger 20. The feed is then adapted to be conveyed by the auger upon actuation thereof along the tube 24. It should further be apparent that the feed will be dispensed into the trough 14 through the apertures 34. This will be accomplished in seriatim along the length of the tube 24. That is, the feed will be dispensed through the first aperture 34 in the tube and then due to the pile up of material in the trough or tube 14, the feed will then be conveyed by the auger to the next dispensing aperture 34 and so forth down the line until the trough 14 is substantially filled. It should be noted that the pens 16 may be formed by a plurality of partition members such as 40. This may be used to feed different animals in the various pens thus formed. Accordingly, it may be desirable to vary the amount of feed disposed in various portions of the trough 14 adjacent different pens. For this purpose, a plurality of sliding sleeves such as 42 are carried on the tube 24. Some of the apertures over certain portions of the trough 14 may thereby be closed by merely sliding the sleeve to partially or completely cover the aperture as shown at 44. When in use, the downspout 46 formed integral with the sleeve will allow feed to fall from the aperture 34 into the trough 14. In this manner, an effective control on the amount of feed disposed in certain portions of the trough 14 can be accomplished. The spouts 46 on the sleeves 42 also serve the purpose of laterally containing built-up dispensed material within the trough 14. This will effectively clog the aperture 34 thereby causing the feed to continue on to the next aperture in the series more effectively.

Mounted on the outside of one of the pens is a suitable motor mounting bracket 48. A motor 50 has mounted on its drive shaft 52 a suitable pulley such as 54. The auger shaft 56 is journaled on each of its ends in a bearing such as 58 held captive between the walls of the tube 24. At the right hand end of the apparatus, the auger shaft mounts a suitable pulley such as 60. A flexible endless belt such as 62 is entrained about the pulleys 54 and 60 to form a driving connection between the motor 50 and the auger shaft 56.

Dumping trough means

Supported upon the upstanding end walls 64 and 66 of the pens 16, as well as upon the partition members 40 are a plurality of brackets such as 68 which mount nylon rollers 70 for engagement with the metering trough or tube 14. The tube is formed with a slot or opening such as 72 through which the dispensed feed from the tube 24 is adapted to pass into the interior of the tubular member constituting the metering trough 14.

The tube 14 is closed at both ends by means of end caps such as 74 and 76 bolted to depending brackets such as 78 welded to the interior of the trough 14. The end caps 74 and 76 centrally mount stub shaft portions such as 80 journaled in bearings 82 mounted at one end on the top portion of the motor mounting bracket 48 and mounted at its other end on a bracket such as 84 secured to the upstanding end wall 64 of one of the pens 16. Mounted on the underneath portion of the bracket 84 is a motor 86. A driving gear 88 is mounted on the power shaft 90 of the motor, and is adapted to mesh with a driven gear 92 carried by the left hand stub axle 80 connected to the trough 14. It should thus be apparent, that upon suitable actuation of the motor 86, the tube or metering trough 14 may be rotated through the gear drive and upon the rollers 70 to a position as shown in FIGURE 7 wherein all the feed contained within the trough 14 may be dumped into the corresponding pens therebeneath. Continued rotation of the trough means will return it to its initial starting position.

From FIGURES 6, 7 and 11 it should be noted that longitudinally extending arcuate inserts such as 94 may be disposed in the interior of the trough 14 to vary the cross-sectional space therein. By such means, the maximum volume which can be delivered to any one pen can be effectively controlled. If the feed comprises a fluid material, longitudinal inserts such as 96 may be inserted in the tube at spaced intervals between the apertures 34 to confine the fluid material therebetween.

Starting and control means

Referring to FIGURES 2, 5 and 12 it will subsequently be appreciated that upon filling of the trough 14, the trough means 14 may be operatively conditioned to rotate. This occurs by having a last aperture 98 formed in the tube 24 through which feed passes to a container 100 mounted upon a bracket 102 carried by an actuating arm 104 of a suitable switch such as 106. The switch 106 is adapted to be closed by the weight of the feed material within the container 100 which when full will cause the actuating arm 104 to close the switch 106. Referring to FIGURE 12, it will be seen that upon actuation of the switch 106, a pair of contacts 108 and 110 are bridged to close a circuit to the dump motor 86 through a timing device 112. This circuit includes a conductor 114 connected to one side of a suitable source of electrical energy, contact 108, switch 106, contact 110, through a conductor 116 to the timer 112, through a conductor 118 to the motor 86 and a conductor 120 back to the other side of the source of electrical energy. Of course, the motor will not be rendered operable to cause the rotation of the trough means 14 until the timer is activated. Therefore, while the dump motor may be operatively conditioned to rotate the trough means 14, this will not occur until after an interval set on the timer after the trough has been filled has been reached. Therefore, a possible malfunction of the feed delivery means will not affect the subsequent operation of the trough.

As is also apparent from FIGURE 12, a pair of contacts such as 122 and 124 are opened upon the actuation of the switch 106 to bridge the contacts 108 and 110. This will cause the auger motor 50 to be disconnected from the source of electrical energy to stop any further feeding action. This feeding circuit can be traced from the conductor 126 through a starting switch 128 to the motor 50, from there through a conductor 130 through the switch 106 and the conductor 114 back to the other side of the source of electrical energy.

Referring to FIGURES 1, 3, 6 and 7 it will be seen that the starting switch 128 is mounted upon a suitable bracket 132 connected to the hopper supporting frame. A lever arm 134 pivoted on the frame at 136 and carrying a counterweight such as 138 is adapted to close the switch 128 and start the operation of the apparatus. One end of the lever arm 134 is bifurcated as shown at 140 and mounts a wheel 142 between the furcations. Prior to the beginning of the starting cycle, the wheel 142 is adapted to seat within the slot 72 in the trough 14 and is urged towards said position by a coil spring 144 mounted on the bracket 132 and terminating at one of its ends on the lever 134. However, upon the lever being pivoted in a counterclockwise direction as viewed in FIGURE 3, by any suitable automatic or manually operated means, the counterweight 138 will depress an actuating member such as 146 of the switch 128 to close the switch thereby to start the auger motor 50. This closing pressure on the lever 134 will be maintained until the trough means begins to turn, wherein upon turning of the trough 14, the wheel 142 will act as a cam follower of the surface of the trough means which will act as a cam to keep the switch 128 closed. Upon the trough again reaching its initial starting position, the spring 144 will bias the lever 134 in a clockwise direction as viewed in FIGURE 3 and overcome the turning moment produced by the weight 138 to once again seat the wheel 142 in the slot 72 in the trough. This will effectively recondition the apparatus for another feeding cycle.

Referring to FIGURE 5 again, it should be appreciated that the container 100 can be removed from the bracket 102 by any suitable means whereby the feed disposed therein may also be removed and the container 100 replaced for the subsequent cycle.

Operation

The operation of the stock feeder assembly is as follows: a suitable stock feed is placed within the hopper 18 and due to the sloping walls 36 thereof, the feed is slid by gravity through the opening 38 in the bottom of the hopper onto the auger conveyor 20. Any suitable means which may be time controlled if desired, will rotate the lever 134 in a counterclockwise direction thereby actuating the switch 128. The closing of the switch 128 will render operative the auger motor 50. This will cause the auger conveyor to turn within the tube 24 conveying material along said tube. The feed will then be dispensed through preselected apertures 34 into the trough means 14. This is done in stages as the feed is first dispensed through the first opening 34 until the feed backs up into the spout 46 on the sleeve 42 clogging said opening whereupon the feed moves on to the next opening in seriatim. The volume of feed dispensed to any portion of the trough may be effectively controlled by said sliding sleeves 42 closing selective ones of said apertures 34. Upon the trough 14 being filled with the desired quantity of feed, the auger will convey feed and dispense it through the aperture 98 in the tube 24 and into the container 100. The weight of the feed within the container 100 will cause the actuating arm 104 to bridge the contacts 108 and 110 thereby rendering the dump motor conditionally operative. At the same time, the movement of the switch 106 to the before mentioned position, will cause the contacts 122, 124 to be opened thereby rendering the auger motor inactive and stopping the feed. After the predetermined time interval as set on the timer 112, the dump motor will be rendered operative to rotate the trough means 14 to a position as shown in FIGURE 7 wherein feed will be dumped into the pens 16. During this movement, the wheel 142 follows the surface of the trough means 14 keeping the switch 128 closed but, upon the dumping cycle being completed, the spring 144 returns the wheel 142 to seat within the slot 72 in the trough 14. This will open the switch 128 thereby conditioning the apparatus for the next feeding cycle wherein the lever 134 will again be rotated in a counterclockwise direction to start the operation. During this time interval, the feed may be removed from the container 100 in any suitable manner if desired.

It should therefore be apparent that a novel stock feeding assembly has been provided which not only has means thereon for controlling the volume of feed to be disposed in a suitable stock pen, but comprises an independent feed and dumping arrangement wherein the malfunction of the delivery portion of the apparatus will not affect the operation of the dumping of the feed into the stock pens thereby keeping the animals on their feed schedule. Furthermore, the apparatus is capable of being rendered fully automatic for presenting feed at specified time intervals to the stock.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An automatic stock feeding assembly for controlling the volume of feed delivered to a plurality of stock pens comprising rotatable metering trough means for periodically dumping a quantity of feed in said pens, driving means connected to said metering trough means and causing successive intermittent complete single rotations thereof at predetermined time intervals, feed delivery means spaced from and communicating with said metering trough means for delivering a predetermined quantity of feed thereto, means carried by said delivery means for varying the quantity of feed delivered to sections of said trough means, and control means associated with said feed delivery means for operatively conditioning said metering trough means for rotation upon completion of the filling thereof and simultaneously rendering said feed delivery means inoperative.

2. The assembly of claim 1 further including drive means for rotating said trough means and means for rendering said drive means operable after a predetermined time interval after the operative conditioning of said trough means.

3. The assembly of claim 2 further including starting means for rendering operative said feed delivery means, said starting means being operatively conditioned for another feeding cycle by the completion of the rotative dumping action of said metering trough means.

4. The asembly of claim 1 wherein said feed delivery means includes conveyor means suspended longitudinally of and above said trough means, tubular cover means having a series of longitudinally spaced apertures disposed about said conveyor means preventing communication of said conveyor means with said trough means except through said apertures, said varying means including a plurality of sleeves longitudinally slidable on said cover means for closing selected ones of said apertures.

5. The assembly of claim 1 wherein said metering trough means includes a longitudinally extending rotatable tube, feed reception means formed in said tube, and means disposed in said tube for fixing the maximum volume of feed which can be carried therein.

6. The assembly of claim 4 wherein said metering trough means includes a longitudinally extending rotatable tube, feed reception means formed in said tube, and means disposed in said tube for fixing the maximum volume of feed which can be carried therein.

7. The assembly of claim 6 further including drive means for rotating said tube and means for rendering said drive means operable after a predetermined time interval after the operative conditioning of said tube.

8. The assembly of claim 7 further including starting means for rendering operative said conveyor means, said starting means being operatively conditioned for another feeding cycle by the completion of the rotative dumping action of said tube.

9. A stock feeding assembly periodically delivering measured charges of stock feed at each of a plurality of spaced feeding stations including a feed metering means comprising an elongated hollow metering body journaled for rotation about a substantially horizontal axis adjacent said feeding stations and having a plurality of longitudinally spaced openings each discharging during one portion of each metering body rotation a measured charge of feed at a feeding station, means delivering feed into said metering body and forming measured feed charges each adjacent one of said metering body openings during another portion of each metering body rotation, driving means connected to said metering body and causing successive intermittent complete single rotations thereof at predetermined time intervals.

10. The combination of claim 9 wherein said metering body openings also comprise feed inlet openings receiving feed from said feed delivering means.

11. The combination of claim 9 including flow volume controlling members disposed in said metering body each between a pair of said openings and controlling the quantity of said feed charges formed at said openings.

12. A stock feeding assembly periodically delivering measured charges of stock feed at each of a plurality of spaced feeding stations including a feed metering means comprising an elongated hollow metering body journaled for rotation about a substantially horizontal axis adjacent said feeding stations, said metering body having a plurality of longitudinally spaced openings each comprising a combined feed inlet and feed discharge opening, said openings receiving feed during one portion of each metering body rotation and discharging a measured charge of feed at a feeding station during another portion of each metering body rotation, means intermittently delivering feed into said metering body comprising an elongated hollow feeding body adjacent said metering body and disposed upon an axis parallel thereto, means introducing feed into said feeding body, said feeding body having a plurality of longitudinally spaced delivery openings each delivering feed to one of said metering body openings, said delivery openings being each placed in communication with one of said metering body openings during said one portion only of each metering body rotation, drive means connected to said metering body and causing successive, intermittent complete single rotations thereof at predetermined time intervals.

13. The combination of claim 12 including a power operated feed distributing means movably received in said feeding body and conveying feed therealong to all of said delivery openings.

14. The combination of claim 13 wherein said distributing means comprises a conveyor auger journaled within said feeding body.

15. The combination of claim 14 including flow control means movably mounted upon said feeding body and each adjustably controlling flow through one of said delivery openings.

16. The combination of claim 15 wherein each flow control means comprises a sleeve slidably embracing said feeding body and having a spout extending into close proximity to said metering body, said spout body successively registrable with a metering body opening for delivering feed thereinto and with the imperforate portion of said metering body for closing said spout.

17. The combination of claim 12 including flow control means movably mounted upon said feeding body and each adjustably controlling flow through one of said delivery openings.

18. The combination of claim 17 wherein each flow control means comprises a sleeve slidably embracing said feeding body and having a spout extending into close proximity to said metering body, said spout body successively registrable with a metering body opening for delivering feed thereinto and with the imperforate portion of said metering body for closing said spout.

References Cited by the Examiner
UNITED STATES PATENTS

| | | | |
|---|---|---|---|
| 2,681,639 | 6/54 | Littlefied | 119—57 |
| 2,921,670 | 1/60 | Albers | 198—213 |
| 2,940,639 | 6/60 | Winter | 222—60 |
| 2,961,126 | 11/60 | Craig | 222—14 |
| 3,026,845 | 3/62 | Winter | 119—52 |
| 3,029,925 | 4/62 | Martin et al. | 198—64 |
| 3,103,203 | 9/63 | Haen | 119—52 |
| 3,105,463 | 10/63 | Pilch | 119—52 |
| 3,123,050 | 3/64 | Haen | 119—52 |

SAMUEL KOREN, *Primary Examiner.*

ALDRICH F. MEDBERY, *Examiner.*